US006973752B2

(12) United States Patent
Anderson

(10) Patent No.: US 6,973,752 B2
(45) Date of Patent: *Dec. 13, 2005

(54) AQUATIC PLANTING PROCESS AND RELATED PLANT AND SEED HOLDERS

(76) Inventor: James F. Anderson, 3441 24th St. SE., Ruskin, FL (US) 33570

( * ) Notice: Subject to any disclaimer, the term of this patent is extended or adjusted under 35 U.S.C. 154(b) by 0 days.

This patent is subject to a terminal disclaimer.

(21) Appl. No.: 10/643,326

(22) Filed: Aug. 20, 2003

(65) Prior Publication Data

US 2004/0031193 A1 Feb. 19, 2004

Related U.S. Application Data

(63) Continuation-in-part of application No. 09/871,416, filed on May 31, 2001, now Pat. No. 6,665,981.

(51) Int. Cl.[7] .............................. A01C 7/00; A01G 9/02; A01G 33/00
(52) U.S. Cl. ...................... 47/58.1 R; 47/65.5; 47/65.7; 111/200
(58) Field of Search ........................... 47/58.1 R, 65.7, 47/65.5; 405/24, 303; 111/200

(56) References Cited

U.S. PATENT DOCUMENTS

| | | | | |
|---|---|---|---|---|
| 5,024,560 A | * | 6/1991 | Reilly | 405/303 |
| 5,338,131 A | * | 8/1994 | Bestmann | 405/24 |
| 5,425,597 A | * | 6/1995 | Bestmann | 405/24 |
| 5,678,954 A | * | 10/1997 | Bestmann | 405/24 |
| 6,665,981 B1 | * | 12/2003 | Anderson | 47/58.1 R |
| 6,793,438 B2 | * | 9/2004 | Anderson | 405/24 |
| 2004/0123521 A1 | * | 7/2004 | Anderson | 47/58.1 R |

FOREIGN PATENT DOCUMENTS

| | | | | |
|---|---|---|---|---|
| DE | 4140933 A1 | * | 6/1993 | ............ A01G 9/02 |
| JP | 8-84532 | * | 4/1996 | ............ A01G 9/02 |
| JP | 09316851 A | * | 12/1997 | ............ E02B 3/14 |
| JP | 10-43 | * | 1/1998 | ............ A01G 33/00 |
| JP | 2001-299133 | * | 10/2001 | ............ A01G 33/00 |
| JP | 2002-17167 A | * | 1/2002 | ............ A01G 9/02 |
| JP | 2002330652 A | * | 11/2002 | ............ A01G 33/00 |
| JP | 2002335783 A | * | 11/2002 | ............ A01G 31/00 |

OTHER PUBLICATIONS

Dawes. 2002. Seagrass Restoration in Tampa Bay, Florida. Tampa Bay Pilor Sludy, 2nd Annual Science Conf., St. Petersburg.*
Kellogg. 2002. Seagrass Restoration in Tampa Bay. at http://soundwaves.usgs.gov.*

* cited by examiner

Primary Examiner—Jeffrey L. Gellner
(74) Attorney, Agent, or Firm—Donald R. Bahr

(57) ABSTRACT

A process for planting aquatic plants and seeds underwater on the bottom and edges of an estuary, where an aquatic plant or seed which is ready for planting is positioned in a holder having a means for retaining the plant or seed. The holder further has a bottom gripping section which is secured to the holder. The preformed holders may be positioned on the bottom of the estuary or broadcast onto the surface thereof. The preferred bottom gripping sections are rocks, stones and mollusk shells. The holder also incorporates an organic button which retains the aquatic plant or seed during the planting process. The plant or seed retaining section can be designed to decompose in a predetermined period of time. This predetermined period of time may be correlated to the growing cycle of an aquatic plant or the germination cycle of an aquatic plant seed.

17 Claims, 1 Drawing Sheet

AQUATIC PLANTING PROCESS AND RELATED PLANT AND SEED HOLDERS

RELATED APPLICATIONS

This application is a continuation in part application of application Ser. No. 09/871,416 Filed May 31, 2001 now U.S. Pat. No. 6,665,981.

BACKGROUND

This invention is concerned with a process and related apparatus whereby aquatic plants may be planted underwater for purposes of restoration. The restoration of all aspects of the environment has become extremely important in recent years. The three areas of restoration which are of primary importance are reducing air pollution, restoring and cleaning up the land and cleaning up and restoring our waterways, the oceans and related estuaries. It is these related estuaries that are the primary thrust of the subject invention.

As a result of the decrease in water quality millions of acres of aquatic plant life, which form an important part of the aquatic eco system have been destroyed. That is because of a decrease in water quality, in other words pollution, aquatic plant life has been destroyed. In most cases this destruction has been gradual over a long period of years however in some instances it can be rapid for example as the result of a ship wreck or grounding.

Because aquatic plant life is an important part of the complex aquatic environment the restoration of this plant life is of primary importance.

The natural restoration of aquatic plant life is an extremely slow process. While it is possible to manually plant shoots of aquatic plants and seeds of aquatic plants, due to the cost of labor, the manual planting of sea grass plants and seeds is at best been marginally successful. Due to the difficulty of manually planting shoots and seeds of aquatic plants the cost of manually planting just one acre of an estuary can be many tens of thousands of dollars. Further manual planting, in some instances is of questionable success as the person doing the planting in walking over the bottom of an estuary does further damage by crushing other plants which may be growing in the area.

This invention is concerned with a process and apparatus whereby sea grass can be quickly planted in an economical fashion.

As used in connection with this invention the term aquatic plant life and sea grass and seeds therefore, includes many species of plant life such as *halodule, wrightii* (shoal grass), *thalassia* (turtle grass) etc.

Aquatic plant life as it exists in estuaries is important in preventing water pollution as this plant life acts as a filter for many pollutants and hence this plant life helps to maintain water quality.

The restoration of aquatic life to the bottom of our estuaries is extremely important as this aquatic plant life plays a critical function in the total marine eco system. A large number of important marine animals, both warm and cold blooded, rely totally or in part on this aquatic plant life for a breeding area, for cover, for food etc. for example the endangered manatee relies solely on sea grass as its food source.

OBJECTS

The primary object of this invention is a process whereby aquatic plant life and seeds therefore may be positioned on and planted in the bottom and edges of an estuary.

Still another object is related apparatus whereby this planting may be effected with minimal damage to the bottom of the estuary.

Still another object of this invention is a process for growing aquatic plant life such that it is suitable for planting on the bottom of an estuary.

Another object is a holder for use in planting aquatic plants and seeds.

DESCRIPTIONS OF THE DRAWINGS

DESCRIPTION OF THE PREFERRED EMBODIMENT

The subject invention relates to a process for planting aquatic plants and seeds therefore, such as a wide variety of sea grasses. The invention is also concerned with a process for growing aquatic plants such that they are suitable for use with the process and apparatus of this invention.

The process of this invention in its broadest terms comprises the growing and positioning of a shoot or a seed of an aquatic plant in a holder which facilitates its planting underwater.

As is shown in U.S. Pat. No. 6,070,537 issued Jun. 6, 2000. This invention is concerned with a plurality of composite structures which may be manually positioned on an estuary bottom. Further these composite structures may be broadcast from a boat and allowed to settle to the bottom of the estuary. Likewise floating holders for plants and seeds may be cast onto the surface of an estuary. It is desirable to have the whole planting system formed from natural materials. A plurality of natural holders are illustrated in FIGS. 1–8

Figure 1:
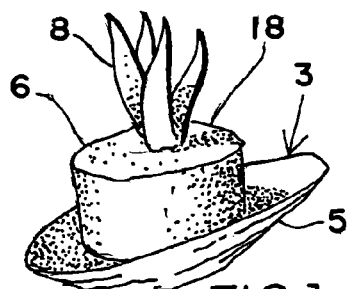
FIGS. 1 and 2 are perspective views showing holders which utilize mollusk shells.
Figure 2:
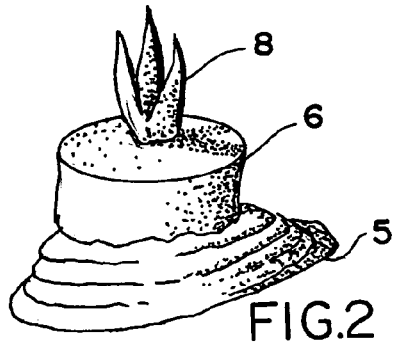

One embodiment of a natural holder 3 is illustrated in FIGS. 1 and 2.

In this structure the plant retaining section is a button 6 which is secured to a mollusk shell 5. Shell 5 is preferably one half of an oyster or clam shell. An aquatic plant shoot 8 is shown protrudes from button 6. Button 6 may incorporate fertilizer which will aid the growth of plant shoot 8. Shell 5 forms an estuary bottom gripping section. It is understood by one skilled in the art that plant shoot 8 may be replaced with a sea grass seed or seeds.

Since holder 3 is formed from a mollusk shell the composite system is all natural and hence nothing foreign is introduced into or on the estuary bottom or into the local eco venue.

As is shown in FIG. 2 button 6 may be secured to either side of mollusk shell 5. However it is preferred that button 6 be secured to the inside of mollusk shell 5 as is illustrated in FIG. 1.

Figure 6:
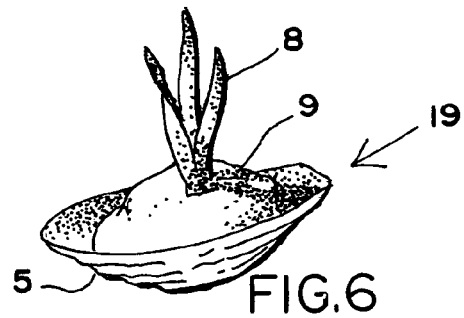
FIG. 6 is a perspective view of a holder wherein the plant is secured with a biomass.

In accordance with still another embodiment button 6, as a defined structure is eliminated and replaced with a biomass 9 as is shown in FIG. 6. Biomass 9 consist of a growing medium such a peat moss which is initially in a semi liquid paste form which incorporates an adhesive. Plant 8 may be replaced by an aquatic plant seed not shown.

As is discussed above in connection with button 6 biomass 9 may incorporate fertilizer and other plant nutrients.

Figure 3:
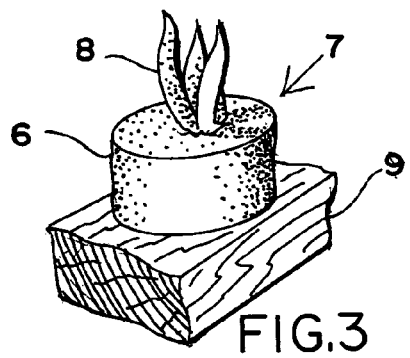
FIG. 3 is a perspective view showing a floatable holder.

FIG. 3 illustrates another embodiment of an aquatic plant holder for use in this invention wherein a button 6 is secured to a floatable base 9, a block of wood 9 being illustrated. The composite density of holder 7 is less than 1 therefore holder 7 will float. This ability to float is useful when it is desirable to plant plants in very shallow water as holder 7 can be broadcasted on to the water and allowed to drift into shallow water until it is grounded and grips the estuary bottom. While a rectangular block of wood 9 is shown, this base can assume other shapes such as disc shaped, tubular shaped or round shape.

Holder 7 is useful in planting plants at the water edge such as restoring mangroves wherein shoot 8 is a mangrove which is allowed to drift to the edge of the estuary where it can take root. It is understood that shoot 8 could be replaced with an aquatic plant seed.

Figure 4:
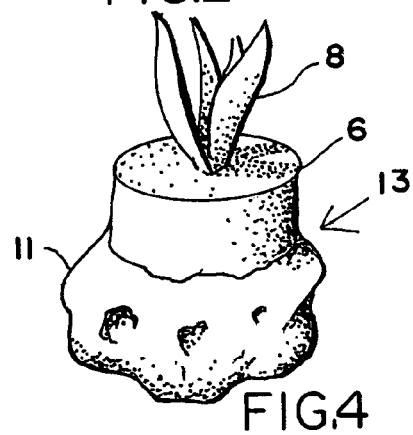
FIG. 4 is a perspective view of a holder which utilizes a stone.

FIG. 4 illustrates still another embodiment of an aquatic plant holder 13 wherein a button 6 is secured to a rock 11 which forms the estuary bottom gripping section.

Figure 5:
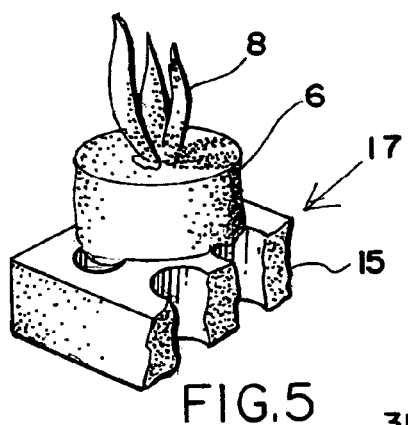
FIG. 5 is a perspective view of a holder which utilizes a brick section.

Still another embodiment of an aquatic plant holder 17 is shown in FIG. 5. In aquatic plant holder 17 a button 6 is secured to a section of brick 15. Brick section 15 can be designed to compose over a period of time by controlling the degree to which brick section 15 is fired. Brick section 15 comprises the estuary bottom gripping section.

Referring to FIG. 4 rock 11 can be any dense substance such as crushed aggregate, gravel, stones etc.

After the formation of aquatic plant holders 3,7,13, 17 and 19 aquatic plant 8 can be incubated in a nursery prior to the placement of the composite structures into the estuary.

The composite density of aquatic plant holders 3,13, 17 and 19 is greater than 1 due to the incorporation of dense estuary bottom gripping sections 5,11 and 15 into the holders. Because these densities are greater than 1, these aquatic plant holders will sink to the estuary bottom.

While specific bases 5,11 and 15 are shown in FIGS. 1–6, these estuary bottom gripping sections can also be formed from polymeric materials which are not harmful to the environment such as polymeric materials which are blended with materials such as starch. These blended polymeric materials can be engineered to decompose in a set period of time after being exposed to ultraviolet light or to an aqueous environment such as warm salt water. This decomposition can be timed to a point in time at which a plant contained therein takes root or a seed contained therein starts to germinate.

Any suitable adhesive or mechanical means may be used to secure button 6 to a suitable base. An example of a suitable adhesive is an adhesive sold under the trademark 5200 by the 3M Corporation.

The plant gripping section button 6 can be formed from any material which is capable of holding plant 8 or an aquatic plant seed during the planting process. In the preferred embodiment button 6 is formed from an organic material such as compressed peat moss, compressed polystyrene beads, compressed manure, mixtures thereof etc. Button 6 incorporates an aperture 18 which is capable of retaining plant 8 or a suitable seed. Buttons being formed from compressed peat are the preferred embodiment for use with this invention, as they are capable of holding plant 8 and suitable seeds during incubation in a nursery and during planting.

Button 6 is used in this invention may be laced with fertilizer and trace minerals which aid in the growth and root formation of plant 8.

Button 6 when formed from compressed peat moss expands after it is exposed to an aqueous environment.

If incubated in a nursery once plant 8 has formed roots, the composite structure is planted in accordance with the process of this invention.

As is discussed above a seed could be substituted for plant 8 in button 6 or its equivalent wherein the seed would germinate in button 6.

Figure 7:
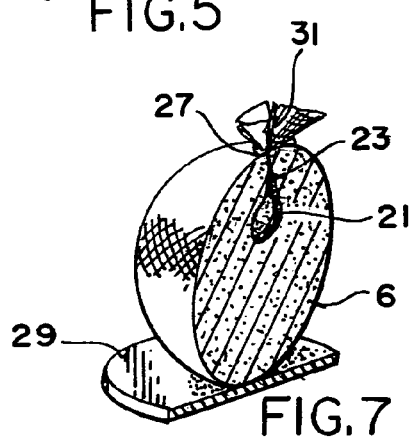
FIG. 7 is a perspective view of a holder with an aquatic plant seed therein.

FIG. 7 shows one embodiment whereby one or more seeds 21 may be incorporated into a suitable preformed button 6. As can be seen button 6 incorporates an cavity 23. One or more seeds 21 are placed in the cavity 23. Seeds 21 may be secured therein with a biodegradable adhesive which will disintegrate at a predetermined period of time, which may be the period of time at which seed 21 starts to germinate. Because the adhesive disintegrates it does not interfere the germination of seed 21 or the growing of the resulting aquatic plant. The structure shown further incorporates a disc 29 which will bite into the estuary bottom.

Seed 21 may be secured in cavity 23 with a biomass such as biomass 9 as is described above in connection with FIG. 6. Biomass 9 can be designed to disintegrate in a predetermined period of time which can be the time when plant 8 starts to grow or seed 21 starts to germinate. An example of a suitable biomass is a mixture of an organic growing medium and a binder such as a water soluble adhesive.

The composite structure may be encapsulated and secured together with a flexible, biodegradable membrane 31. The top of membrane 31 may be secured together with a string or elastic band 27.

Figure 8:
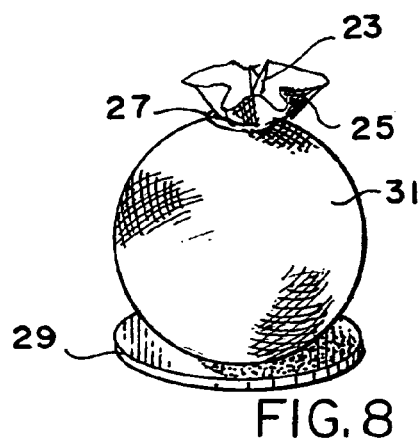
FIG. 8 is a perspective view showing a means of retaining an aquatic plant holder.

FIGS. 5,7 and 8 discloses still another embodiment of this invention wherein a bio mass which is suitable for plant growth is encapsulated with a flexible, porous, biodegradable membrane 31. A plant 8 is positioned in the bio mass. The composite structure is secured together with a string or elastic band 27. A rigid disc 29 is secured to the bottom of the composite structure. The natural flow of the water in the estuary cause disc 29 to bite into the estuary bottom, thereby securing the composite structure in place. Disc 29 is secured in place with a suitable adhesive, such as 3M 5200, to membrane 31. It is preferred that disc 29 be found from this metal sheet. Disc 29 can be plated as a means of controlling its degradation in a predetermined period of time. Naturally the corrosive nature of the water in the estuary must be considered when disc 29 is engineered to degenerate in a predetermined period of time.

The above description and drawings are illustrative of modifications that can be made without departing from the present invention, the scope of which is to be limited only by the following claims.

What is claimed is:

1. A process for planting individual aquatic plant seeds or groups of aquatic plant seeds underwater, in an estuary having a bottom, which comprises the steps of
   a. positioning an aquatic plant seed in a holder, which has an aquatic plant seed retaining section and an estuary bottom gripping section, which are directly secured to each other,
   b. placing said aquatic plant seed holder in an estuary such that the estuary bottom gripping section is allowed to come into contact with the estuary bottom,
   c. Wherein the density of the composite aquatic plant holder is greater than 1 gm/cc.

2. The process of claim 1 wherein the holder is manually placed in contact with the estuary bottom.

3. The process of claim 1 wherein the holder is broadcast onto the estuary surface.

4. The process of claim 1 wherein the estuary gripping bottom section disintegrates in a predetermined period of time.

5. The process of claim 2 wherein the estuary gripping bottom section disintegrates in a predetermined period of time.

6. The process of claim 3 wherein of the estuary gripping bottom section disintegrates in a predetermined period of time.

7. The process of claim 1 wherein the aquatic plant seed retaining section is formed from an organic medium which is conducive to aquatic plant growth.

8. The process of claim 2 wherein the aquatic plant seed retaining section is formed from an organic medium which is conducive to aquatic plant growth.

9. The process of claim 3 wherein the aquatic plant seed retaining section is formed from an organic medium which is conducive to aquatic plant growth.

10. The process of claim 4 wherein the aquatic plant seed retaining section is formed from an organic medium which is conducive to aquatic plant growth.

11. The process of claim 5 wherein the aquatic plant seed retaining section is formed from an organic medium which is conducive to aquatic plant growth.

12. The process of claim 6 wherein the aquatic plant seed retaining section is formed from an organic medium which is conducive to aquatic plant growth.

13. The process of claim 1 wherein the estuary bottom gripping section is a mollusk shell.

14. The process of claim 2 wherein the estuary bottom gripping section is a mollusk shell.

15. The process of claim 3 wherein the estuary bottom gripping section is a mollusk shell.

16. The process of claim 8 wherein the estuary bottom gripping section is a mollusk shell.

17. The process of claim 9 wherein the estuary bottom gripping section is a mollusk shell.

\* \* \* \* \*